July 17, 1962 K. G. E. DERMAN 3,044,787
SEALING ARRANGEMENT
Filed Sept. 26, 1958 2 Sheets-Sheet 1

INVENTOR:
KARL GUSTAV EINAR DERMAN

BY Howson & Howson
ATTYS.

July 17, 1962 K. G. E. DERMAN 3,044,787
SEALING ARRANGEMENT

Filed Sept. 26, 1958 2 Sheets-Sheet 2

INVENTOR:
KARL GUSTAV EINAR DERMAN
BY Howson & Howson
ATTYS.

United States Patent Office 3,044,787
Patented July 17, 1962

3,044,787
SEALING ARRANGEMENT
Karl Gustav Einar Derman, Savedalen, Sweden, assignor to Aktiebolaget Svenska Kullagerfabriken, Goteborg, Sweden, a corporation of Sweden
Filed Sept. 26, 1958, Ser. No. 763,517
Claims priority, application Sweden Sept. 30, 1957
2 Claims. (Cl. 277—83)

The present invention relates to a device for providing a seal between two relatively rotatable members, of which one is provided with a surface of rotation concentric with the axis of rotation and arranged to press an O-ring mounted thereon under tension against another surface transverse to the axis of rotation and fixed to the other of said relatively rotatable members characterized thereby, that the angle between the axis of rotation and the tangent to the generatrix of the surface of rotation at the line of contact between the O-ring and the said surface is less than 30°.

Figure 1:
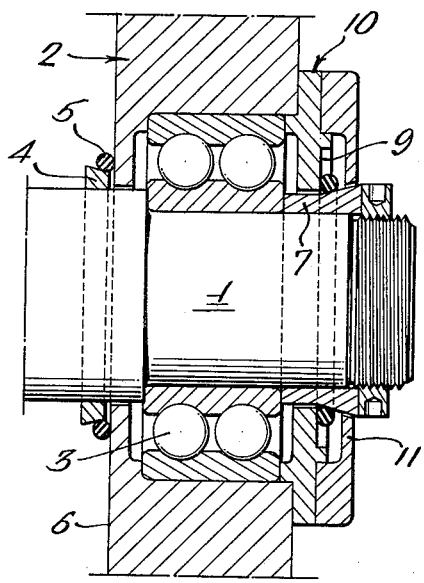
Figure 2:
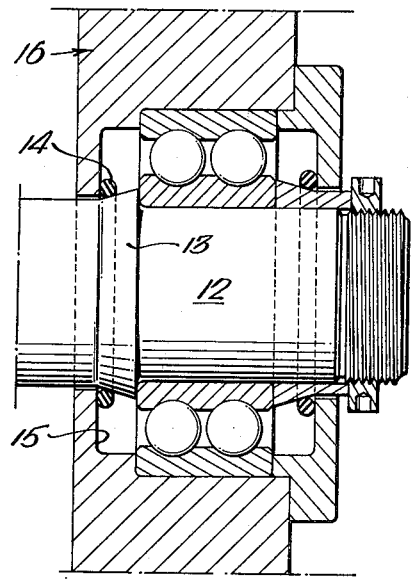
Figure 3:
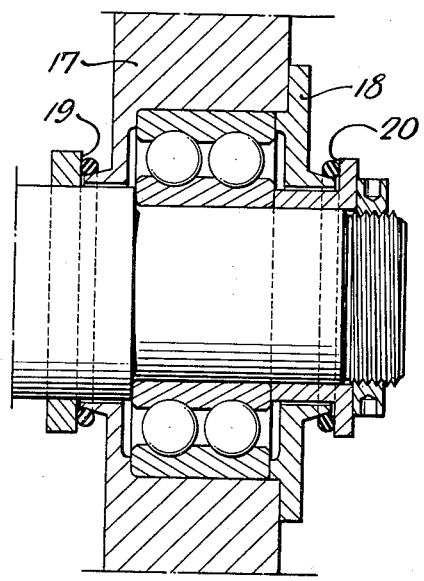
Figure 5:
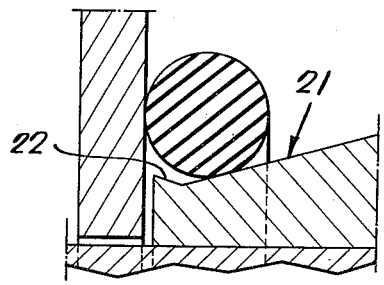
Figure 4:
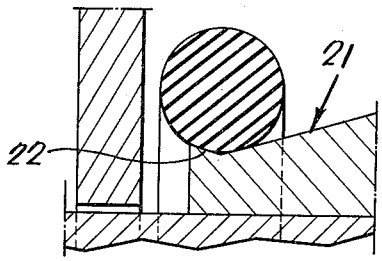
Figure 10:
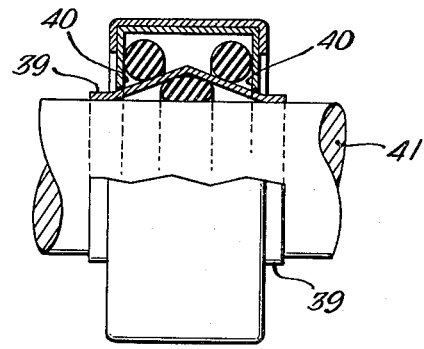
Figure 11:
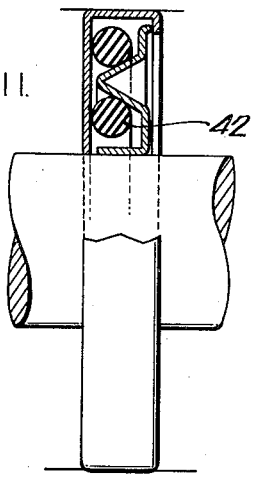
Figure 12:
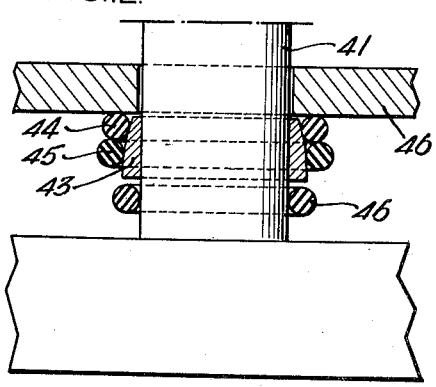

The invention is described in the following in connection with the accompanying drawings which show several forms of the same. FIGS. 1 and 3 show the sealing device used in connection with rolling bearings, where the greatest importance has been attached to prevent foreign particles from penetrating into the bearing housing. The purpose of the device illustrated in FIG. 2 is mainly to prevent the lubricant from leaving the housing. FIGS. 4 and 5 disclose a form of the invention for facilitating the work of assembling the seal. FIGS. 6 to 9 show different forms of sealing devices according to the invention as applied to ball bearings. Two different forms of a separate sealing unit are shown in FIGS. 10 and 11, and FIG. 12, finally, shows a form of the invention by means of which a damaged O-ring can easily be replaced by a new one.

In FIG. 1, the numeral 1 designates a shaft carried in a rolling bearing 3 mounted in a bearing housing 2. On the shaft is mounted a ring 4 having a tapering outer peripheral surface on which is mounted an expanded O-ring 5, the ring 4 being in such a position, that the taper thereof causes the O-ring to press against a surface 6 of the housing 1 perpendicular to the axis of rotation.

In order that the O-ring may roll instead of sliding on the conical surface, the angle between the generatrix of the conical surface and the axis of rotation should be less than 30°. In this case the advantage is obtained that if the surface 6 is not exactly perpendicular to the axis of rotation, the O-ring will roll slightly to and fro on the conical surface but always remain in contact with the transverse surface. There will thus be no wear on the O-ring where it contacts with the conical surface as would be the case if sliding took place, and the ring will respond immediately to changes in conditions. On the other hand, a sliding ring will require some little time to adjust its position and leakage may thus occur.

The principle of the seal shown at the right hand side of the housing in FIG. 1 is the same as for the seal described above, but its design is somewhat different. The sleeve 7 which serves to retain the bearing 3 in position, is provided at one end with an external conical surface, on which an expanded O-ring is mounted. Due to the elasticity of the O-ring the conical surface presses it against a surface 9 on the cover 10 of the bearing housing. The O-ring can be protected from damage by a cover 11 mounted on the cover 10. The device shown in FIG. 1 is especially suitable for use when it is desired to protect the bearing against penetration of foreign substances from the surrounding atmosphere. In this case the O-rings also serve as valves through which any superfluous lubricant in the bearing housing can escape.

In FIG. 2 the numeral 12 designates a shaft which is provided with a conical portion 13, on which the O-ring 14 is mounted under tension, and is thus caused to be pressed against an internal surface 15 of the bearing housing 16. The seal on the opposite side of the bearing is similar to that shown in FIG. 1 except that it tapers in the opposite direction. The principal object of the seal according to FIG. 2 is to prevent leakage of lubricant from the bearing housing.

FIG. 3 discloses another form of a bearing application. The main difference between the device shown in FIG. 1 and that of FIG. 3 is that the bearing housing 17 and the cover 18 are each provided with conical surfaces, on which the O-rings are mounted under tension and that the sliding engagement takes place with surfaces 19 and 20 perpendicular to the shaft, while in the device according to FIG. 1 the conditions are the reverse.

Since an O-ring mounted under tension on a conical surface has a tendency to roll off the surface, difficulties may arise in assembling a sealing device according to some of the forms described above. In order to facilitate the assembly work, the small end 21 of the conical member may be provided with an opposed, substantially conical surface 22, which forms a trough in which the O-ring can rest and thereby eliminate the risk that it may roll off during assembly. This risk is eliminated in FIG. 4. FIG. 5 shows the device in sealing position.

Figure 6:
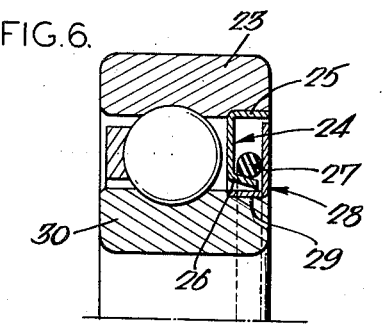
Figure 7:
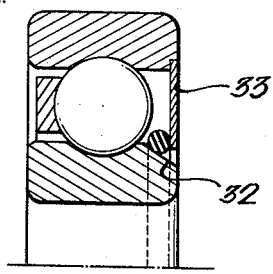
Figure 8:
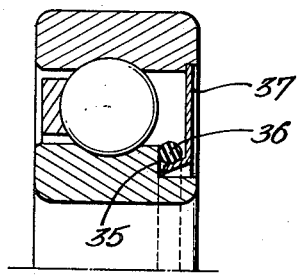
Figure 9:
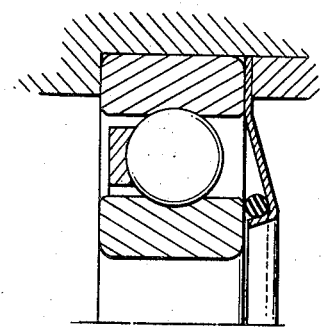

The tapering surface on which the O-ring is mounted needs not necessarily be formed according to FIGS. 1–5. It may, for example, be formed from an annular piece of sheet metal. FIG. 6 shows a seal of this type mounted in a ball bearing. In the outer race ring 23 is mounted a ring 24 having a U-shape profile. The outer flange 25 forms a means for fixing the ring 24 in the race ring 23, and the inner flange 26 which is circular forms a seat for the O-ring 27, which is thereby caused to press against a substantially radially directed ring 28 of sheet metal which is seated on the inner race ring 30 of the bearing by means of a flange 29. In the form of the invention illustrated in FIG. 7 the conical surface 32 is formed directly on the inner race ring and the transverse sealing surface is provided on a flat annular ring 33, mounted on the outer race ring. The form according to FIG. 7 is suitable for use even when the outer race ring or the inner race ring rotates at such a low rate of speed that the influence of the centrifugal forces on the grip between the O-ring and its supporting surface will be inconsiderable, while the form of the invention shown in FIG. 8 is intended for use in connection with a rapidly rotating inner race ring. The sealing surface 35 is in this case formed as a shoulder on the inner race ring against which the O-ring 36 is pressed by a flange provided on a sheet metal ring 37. In the three forms of the invention shown in FIGS. 6, 7 and 8, the sealing surface is provided within a bearing. FIG. 9, on the other hand, discloses a simple device which may be used in connection with a standard ball bearing. The conical surface, which carries the O-ring, is in this case formed in an annular sheet metal membrane having the same outer diameter as the ball bearing located in contact therewith. The O-ring seals directly against one of the plane side phases of the inner race ring.

The invention is also applicable for use with a separate sealing unit as shown in FIGS. 10 and 11. A device according to the first mentioned figure comprises mainly an annular sleeve 39 having two oppositely directed conical surfaces having the same angle of conicity. On each of these conical surfaces an O-ring is mounted under tension. The O-ring engages with a plane surface 40 of a sheet metal ring. The device is retained on a shaft 41 by means of a compressed O-ring.

The device disclosed in FIG. 11 differs from those described above thereby that an inner O-ring 42 is compressed to a diameter smaller than its diameter in free condition. This device can be used under special circumstances even if a device having expanded O-ring can be applied generally.

FIG. 12 shows a shaft 41 having a machine member of such dimensions or mounted in such manner, that the dismantling of adjacent machine parts is very complicated. The seal between the shaft 41 and a wall 46 penetrated by the shaft is illustrated as comprising a sleeve 43 mounted to the shaft and O-rings 44 and 45 mounted on a substantially tapering surface thereof. The purpose of this device is to provide a reserve O-ring 45 to replace the O-ring 44 in case the latter breaks or becomes damaged. In order that the reserve ring 45 should not exert pressure against the sealing ring 45, the outer surface of the sleeve 43 is not a true cone but is generated by a curve line the tangent of which forms an angle of about 15° with the axis of rotation at its smallest diameter and which has a successively diminishing angle approaching 0° at the greater diameter of the sleeve.

The O-ring 46 is a further reserve ring intended for use in case the O-ring 45 also becomes damaged.

The sealing device according to the present invention has several advantages as compared with other sealing devices of known types. The O-ring is a common standard element and is consequently very cheap. It does not require adjustment since its own elasticity and the angle of conicity of the ring on which it is mounted ensure a practically constant pressure against the sealing surface independent of temperature and wear.

The pressure between the sliding parts which as a rule is small compared with that in conventional sealing means can be varied to suit different requirements through a suitable choice of taper and tension in the O-ring. Since the O-ring rolls on the tapering surface it will always contact evenly against the sealing surface even if the latter should be slightly oblique or if angular displacement occurs between shaft and bearing housing. A seal according to the invention is thus self-aligning and, as regards its function, comparatively independent of the accuracy with which the assembling is carried out.

In certain cases it is also possible to provide for lubricating of the bearing. In the devices shown in FIGS. 1 and 2, for example, the O-ring may be displaced sideways to permit lubricant to be introduced through the circular opening between two relative each other rotatable parts. As mentioned above the O-rings can also serve as safety valves to relieve excess pressure in the bearing housing. Another advantage to which reference has been made above is the possibility of providing one or more reserve seals on the shaft, e.g. in places accessible only with difficulty, whereby a damaged ring can be quickly replaced by a new one. It is also possible, in such cases, to cut an O-ring, wrap it around the shaft and then unite the ends by a suitable adhesive or by vulcanizing. Comparative tests between seals according to the invention and earlier types of seals have shown that the effectiveness of the seal is about the same but that the seal according to the invention is superior as regards wear, mainly due to the fact that it generates less heat than other types of seals. For example, under similar conditions, the rise in temperature taking place with the use of a seal of known type was 58° C., while with the seal according to the invention the rise in temperature was only 23° C. The rise in temperature is comparatively small at high speeds and even in cases where the pressure is considerable.

I claim:

1. In a sealing arrangement for providing a seal between relatively rotatable members comprising a tapered surface of rotation on one of said members concentrically with the axis of rotation, a surface on the other of said members confronting said tapered surface and disposed transversely to the axis of rotation, said tapered surface converging toward said transverse surface and having an angle of taper of less than 30 degrees, and an O-ring concentric with the axis of rotation mounted under radial tension on said tapered surface, whereby said O-ring tends to roll on said surface rather than slide thereon against the face of said transverse surface to provide a seal between said tapered and transverse surfaces.

2. In a sealing arrangement for providing a seal between relatively rotatable members and comprising a tapered surface of rotation on one of said members concentric with the axis of rotation, a surface on the other of said members confronting said tapered surface and disposed transversely to the axis of rotation, and an O-ring concentric with the axis of rotation and mounted under radial stress on said surface, said radial stress cooperating with said tapered surface to bias said ring against the face of said transverse surface, the angle of taper of said surface of rotation at the line of engagement between said O-ring and said surface being less than 30 degrees whereby said O-ring tends to roll on said surface rather than slide thereon, said tapered surface terminating adjacent said transverse surface in an opposed surface operable upon separation of the arrangement to limit rolling displacement of said O-ring on said tapered surface beyond the end of said surface adjoining said transverse surface.

References Cited in the file of this patent
UNITED STATES PATENTS

| | | |
|---|---|---|
| 797,796 | Devlin | Aug. 22, 1905 |
| 1,473,110 | Litle | Nov. 6, 1923 |
| 2,281,010 | Reynolds | Apr. 28, 1942 |
| 2,512,148 | Gaines | June 20, 1950 |
| 2,543,918 | Lower | Mar. 6, 1951 |
| 2,617,668 | Stewart | Nov. 11, 1952 |
| 2,710,206 | Huber | June 7, 1955 |